(12) United States Patent
Messer

(10) Patent No.: US 9,052,486 B2
(45) Date of Patent: Jun. 9, 2015

(54) FIBER OPTIC CABLE AND METHOD OF MANUFACTURE

(75) Inventor: Mark Alexander Messer, Saint Augustine, FL (US)

(73) Assignee: Carlisle Interconnect Technologies, Inc., Saint Augustine, FL (US)

( * ) Notice: Subject to any disclaimer, the term of this patent is extended or adjusted under 35 U.S.C. 154(b) by 179 days.

(21) Appl. No.: 12/909,687

(22) Filed: Oct. 21, 2010

(65) Prior Publication Data

US 2012/0099825 A1 Apr. 26, 2012

(51) Int. Cl.
*G02B 6/44* (2006.01)

(52) U.S. Cl.
CPC ............ *G02B 6/4436* (2013.01); *G02B 6/4495* (2013.01); *G02B 6/4432* (2013.01)

(58) Field of Classification Search
CPC ... G02B 6/4432; G02B 6/4433; G02B 6/4495
USPC ........................................................ 385/113
See application file for complete search history.

(56) References Cited

U.S. PATENT DOCUMENTS

| | | |
|---|---|---|
| 4,143,942 A | 3/1979 | Anderson |
| 4,147,406 A | 4/1979 | Anderson |
| 4,374,608 A | 2/1983 | Anderson |
| 4,441,787 A | 4/1984 | Lichtenberger |
| 4,510,348 A | 4/1985 | Arroyo et al. |
| 4,515,435 A | 5/1985 | Anderson |
| 4,756,600 A | 7/1988 | Ramsay et al. |
| 4,896,940 A | 1/1990 | Kathiresan et al. |
| 5,002,359 A | 3/1991 | Sayegh |
| 5,074,640 A | 12/1991 | Hardin et al. |
| 5,102,581 A | 4/1992 | Mercier |
| 5,138,684 A | 8/1992 | Bullock |
| 5,171,635 A | 12/1992 | Randa |
| 5,189,721 A | 2/1993 | Sayegh |
| 5,201,020 A | 4/1993 | Kannabiran |
| 5,208,889 A | 5/1993 | Cedrone |
| 5,214,243 A | 5/1993 | Johnson |
| 5,220,133 A | 6/1993 | Sutherland |
| 5,253,318 A | 10/1993 | Sayegh |
| 5,293,442 A | 3/1994 | Sayegh |
| 5,355,427 A | 10/1994 | Gareis |
| 5,408,564 A | 4/1995 | Mills |
| 5,412,749 A | 5/1995 | Sayegh |
| 5,436,994 A | 7/1995 | Ott et al. |
| 5,504,830 A | 4/1996 | Ngo et al. |
| 5,539,849 A | 7/1996 | Petisce |
| 5,539,851 A | 7/1996 | Taylor |
| 5,557,698 A | 9/1996 | Gareis |
| 5,566,266 A | 10/1996 | Nave |
| 5,615,293 A | 3/1997 | Sayegh |

(Continued)

FOREIGN PATENT DOCUMENTS

| | | |
|---|---|---|
| EP | 0072594 | 8/1982 |
| EP | 0527266 | 5/1996 |

(Continued)

*Primary Examiner* — Charlie Y Peng
(74) *Attorney, Agent, or Firm* — Wood, Herron & Evans, LLP

(57) ABSTRACT

A fiber-optic cable for applications subject to extreme temperatures and high crushing and bending forces incorporating a loose fluoropolymer buffer material, a aramid/fiberglass strength member, and a fluoropolymer outer jacket compromising low smoke, low toxicity, and low flammability when exposed to flame.

11 Claims, 13 Drawing Sheets

(56) References Cited

U.S. PATENT DOCUMENTS

| | | | |
|---|---|---|---|
| 5,675,686 A | 10/1997 | Rosenmayer et al. | |
| 5,706,382 A | 1/1998 | Smith | |
| 5,731,088 A | 3/1998 | La Court | |
| 5,764,835 A | 6/1998 | Rubin et al. | |
| 5,811,490 A | 9/1998 | Jozokos et al. | |
| 5,857,051 A * | 1/1999 | Travieso et al. | 385/114 |
| RE36,146 E | 3/1999 | Novack et al. | |
| 5,878,179 A | 3/1999 | Schricker | |
| 5,920,671 A | 7/1999 | Smith | |
| 5,972,441 A | 10/1999 | Campbell et al. | |
| 6,025,044 A | 2/2000 | Campbell et al. | |
| 6,027,779 A | 2/2000 | Campbell et al. | |
| 6,063,496 A | 5/2000 | Jozokos et al. | |
| 6,074,100 A | 6/2000 | Rowland et al. | |
| 6,151,433 A | 11/2000 | Dower et al. | |
| 6,233,284 B1 | 5/2001 | Townshend | |
| 6,233,384 B1 | 5/2001 | Sowell, III et al. | |
| 6,287,692 B1 | 9/2001 | Luo et al. | |
| 6,326,416 B1 | 12/2001 | Chien et al. | |
| 6,352,372 B1 | 3/2002 | Shahid | |
| 6,352,531 B1 | 3/2002 | O'Connor et al. | |
| 6,361,299 B1 | 3/2002 | Quigley et al. | |
| 6,362,249 B2 | 3/2002 | Chawla | |
| 6,365,072 B1 | 4/2002 | Katoot et al. | |
| 6,429,263 B2 | 8/2002 | Hwang et al. | |
| 6,439,777 B1 | 8/2002 | Harrison et al. | |
| 6,453,097 B1 | 9/2002 | Newton et al. | |
| 6,492,453 B1 | 12/2002 | Ebrahimian et al. | |
| 6,527,458 B2 | 3/2003 | Kim | |
| 6,569,794 B1 | 5/2003 | Reid et al. | |
| 6,576,166 B1 | 6/2003 | Perrin et al. | |
| 6,582,116 B2 | 6/2003 | Nielsen | |
| 6,623,172 B1 | 9/2003 | de Jong et al. | |
| 6,638,617 B2 | 10/2003 | Kim et al. | |
| 6,648,520 B2 | 11/2003 | McDonald et al. | |
| 6,652,155 B2 | 11/2003 | Lampert | |
| 6,658,187 B2 | 12/2003 | Militaru | |
| 6,673,866 B2 | 1/2004 | Zolotnitsky et al. | |
| 6,674,946 B2 | 1/2004 | Warden | |
| 6,754,423 B2 | 6/2004 | Simons et al. | |
| 6,781,063 B2 | 8/2004 | Kim et al. | |
| 6,859,593 B2 | 2/2005 | Fournier et al. | |
| 6,882,788 B2 | 4/2005 | Van Bergen et al. | |
| 6,898,354 B2 | 5/2005 | Kim et al. | |
| 7,006,751 B2 | 2/2006 | Provost et al. | |
| 7,049,522 B2 | 5/2006 | Kim et al. | |
| 7,049,523 B2 | 5/2006 | Shuman et al. | |
| 7,068,895 B2 | 6/2006 | Kuijpers et al. | |
| 7,068,899 B2 | 6/2006 | Milicevic et al. | |
| 7,116,877 B2 | 10/2006 | Kuijpers et al. | |
| 7,187,829 B2 | 3/2007 | Anderson et al. | |
| 7,190,867 B2 | 3/2007 | Johnson et al. | |
| 7,194,168 B2 | 3/2007 | Rosenquist | |
| 7,197,216 B2 | 3/2007 | Storaasli et al. | |
| 7,203,405 B1 | 4/2007 | Storaasli | |
| 7,203,408 B2 | 4/2007 | Matthijsse | |
| 7,212,715 B2 | 5/2007 | Dallas et al. | |
| 7,221,831 B2 | 5/2007 | Keller | |
| 7,226,215 B2 | 6/2007 | Bareel et al. | |
| 7,229,674 B2 | 6/2007 | Overton et al. | |
| 7,242,830 B2 | 7/2007 | Storaasli et al. | |
| 7,848,604 B2 | 12/2010 | Reed et al. | |
| 7,955,004 B2 * | 6/2011 | DiMarco | 385/99 |
| 8,290,321 B2 * | 10/2012 | Rhyne et al. | 385/110 |
| 8,401,353 B2 * | 3/2013 | Barker et al. | 385/110 |
| 2004/0190841 A1 * | 9/2004 | Anderson et al. | 385/100 |
| 2004/0240804 A1 | 12/2004 | Mahapatra | |
| 2006/0127016 A1 * | 6/2006 | Baird et al. | 385/113 |
| 2008/0116599 A1 * | 5/2008 | Brown | 264/40.1 |
| 2009/0087148 A1 * | 4/2009 | Bradley et al. | 385/76 |
| 2009/0180744 A1 * | 7/2009 | Bringuier et al. | 385/113 |
| 2010/0092139 A1 * | 4/2010 | Overton | 385/110 |
| 2011/0243514 A1 * | 10/2011 | Nav | 385/110 |

FOREIGN PATENT DOCUMENTS

| | | |
|---|---|---|
| EP | 1094347 | 4/2001 |
| EP | 1076253 | 6/2008 |
| FR | FP2693806 | 1/1994 |
| GB | 2214653 | 6/1989 |
| JP | 59053802 | 3/1984 |
| JP | 0741629 | 10/1995 |
| WO | WO9805493 | 2/1998 |
| WO | WO2005078498 | 8/2005 |

* cited by examiner

| SAMPLE NO. | SPECIFIC OPTICAL DENSITY (Ds) | TIME OF PEAK SMOKE DENSITY (seconds) | POST TEST COMMENTS: | SKETCH/DESCRIPTION |
|---|---|---|---|---|
| | | | | 12 CONDUCTORS, PTFE LOOSE BUFFER, ARAMID/GLASS FIBER STRENGTH MEMBER, PTFE OUTER JACKET. |
| 1 | 11.3 | 240 | MELTING: YES, OUTER INSULATION<br>SAGGING: YES, OUTER INSULATION<br>DELAMINATION: NONE<br>OTHER OBSERVATIONS: SOME FLAMING OF MATERIAL<br>OTHER COMMENTS: NONE | |
| 2 | 4.7 | 240 | MELTING: YES, OUTER INSULATION<br>SAGGING: YES, OUTER INSULATION<br>DELAMINATION: NONE<br>OTHER OBSERVATIONS: SOME FLAMING OF MATERIAL<br>OTHER COMMENTS: NONE | |
| 3 | 7.6 | 238 | MELTING: YES, OUTER INSULATION<br>SAGGING: YES, OUTER INSULATION<br>DELAMINATION: NONE<br>OTHER OBSERVATIONS: SOME FLAMING OF MATERIAL<br>OTHER COMMENTS: NONE | |
| AVG | 7.9 | 239 | | PASS/FAIL |
| MAXIMUM SMOKE DENSITY | 50 (Ds) | | | PASS; AVG: 7.9 |

FIG. 4

Toxicity Test Results

TOXICITY DATA SHEET

TEST METHOD EN3745-602
TEST MODE: Flaming

TEST VALUES
TESTED USING FTIR SPECTROMETER PER 6.2 (j)

GASES TESTED

| Sample # | Hydrogen Cyanide | Carbon Monoxide | Nitrous Oxide | Sulfur Dioxide | Hydrogen Flouride | Hydrogen Chloride |
|---|---|---|---|---|---|---|
| 1 | <3 | 152 | <10 | <15 | <20 | <5 |
| 2 | <3 | 89 | <10 | <15 | <20 | <5 |
| AVG. | <3 | 121 | <10 | <15 | <20 | <5 |
| **Maximum Allowed | 150 | REF. ONLY | 100 | 100 | 200 | 500 |
| PASS/FAIL | PASS | NA | PASS | PASS | PASS | PASS |

FIG. 5

| Cable Description: | INVENTION | S09MD12CNPY (TLC) |
|---|---|---|
| | Results (dB) | |
| MAX Δ (dB) during clamping | 0.00 | -0.39 |

| Cable Description: | INVENTION | M50RB12C6NRO (TLC) |
|---|---|---|
| | Results (dB) | |
| MAX Δ (dB) during -65°C BEND: | 0.00 | -2.41 |
| MAX Δ (dB) during +180°C BEND: | 0.00 | Loss Of Optical Continuity |

| Cable Description: | INVENTION | M50RB12C6NRO (TLC) |
|---|---|---|
| | Results (dB) | |
| MAX Δ (dB) after mandrel bends: | -0.04 | -0.69 |

| Cable Description: | INVENTION | S09MD12CNPY (TLC) |
|---|---|---|
| | Results (dB) | |
| MAX Δ (dB) during 100lb. compression: | 0.00 | -0.45 |

| Cable Description: | INVENTION | S09MD12CNPY (TLC) |
|---|---|---|
| | Results (dB) | |
| MAX Δ (dB) during 30lb. compression: | 0.00 | -1.14 |

| Cable Description: | INVENTION | M50RB12C6NR0 (TLC) |
|---|---|---|
| | Results (dB) ||
| MAX Δ (dB) during 45 zip tie applications: | -0.02 | -1.24 |

FIG. 17

| Cable Description: | INVENTION | M50RB12C6NR0 (TLC) |
|---|---|---|
| De-Icing Fluid | Results (dB) ||
| MAX Δ (dB) during and post immersions: | 0.00 | -0.98 |

FIG. 18

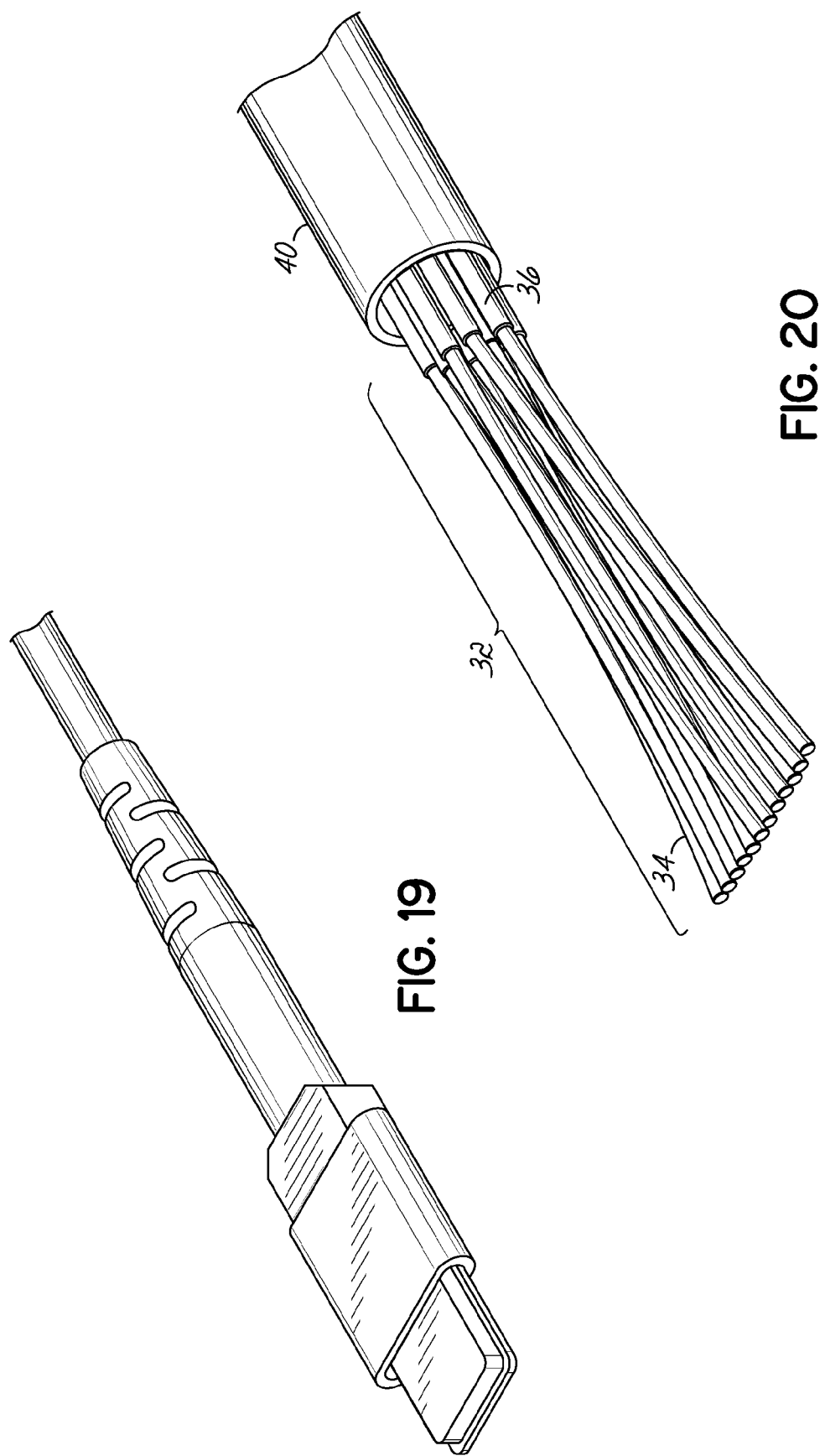

| Cable P/N | Description | Vendor | Weight (12 cables-kg/km) |
|---|---|---|---|
| INVENTION | 3.8, Multi-Channel, Avionics Fiber Cable | Tensolite | 19 |
| NFO(EP)-125-1 | 1.8mm, Simplex, Avionics Fiber Cable | Tensolite | 55.2 |
| C2225 | 1.8mm, Simplex, Avionics Fiber Cable | OFS | 42 |

FIG. 21

FIBER OPTIC CABLE AND METHOD OF MANUFACTURE

FIELD OF THE INVENTION

The present invention relates generally to fiber optic cables and, more specifically, to a fiber optic cable having improved mechanical and optical performance characteristics.

BACKGROUND OF THE INVENTION

Optical fibers are used in an ever-increasing number of applications for transmitting data signals. An optical fiber is a thin transparent strand of material that acts as a waveguide for light. Optical fibers have several advantages over traditional copper conductors, including their light weight, high bandwidth, smaller size, immunity from electromagnetic interference, and low signal attenuation over long distances. Owing to these characteristics, optical fibers are particularly useful for providing a physical transmission medium for communications links and have replaced copper conductors in many communications applications. The small size, light weight and superior performance characteristics of optical fiber or "fiber-optic" cables also makes them attractive to the aerospace industry for both commercial and military applications.

Because the individual strands of optical fibers are fragile, they are usually configured into an overall larger optical cable for practical applications. An optical cable may contain one or more optical fibers, and has a construction that provides mechanical strength and protection from environmental stresses so that the optical fiber may be used reliably in harsh environments. Generally, a fiber optic cable includes a core made of a glass strand, or fiber, that is surrounded by a cladding layer and one or more additional layers. The cladding layer contains optical signals in the glass core. The cladding may also provide color coding so that individual fibers can be identified when making connections in a fiber-optic cable containing more than one optical fiber. One or more additional coatings or buffer layers may then be provided to buffer and support the cladded fiber core. Additional strength member layers may be utilized outside the buffer layers to provide resistance to pulling and other mechanical forces. Finally, an insulated jacket layer may be added to provide a protective outer surface to resist abrasion and other environmental conditions.

Aerospace applications in particular present demanding requirements for fiber-optic cables in both size and weight considerations. Typically, the space within an aircraft is limited and thus the weight and size of cables running throughout an aircraft is always of utmost concern. Furthermore, there are harsh conditions inherent in such operational and installation environments. Still further, even minor failures in the fiber-optic cable can result in significant, undesirable consequences. Operational conditions typical of an aerospace environment typically include high levels of vibration, mechanical stresses, temperature extremes, g-loading, and submersion in caustic fluids. In particular, with regard to the installation environment, it is desirable for a fiber-optic cable used in an aerospace application to tolerate tight bend radiuses, crushing forces, caustic fluids and temperature extremes. Installation within the confined spaces presented by an airframe can subject a fiber optic cable to tight bends, high pinching and crushing forces, as well as high pulling stresses as installers manipulate the cable. Severe bending or forcing the cable around a small radius may result in a kink in the cable, which may result in reduced light transmission sufficient to render the cable inoperative. These performance requirements may present conflicting design choices in providing suitable fiber-optic cables. For example, a fiber-optic cable that is designed to withstand high crushing and pulling forces may be too thick to meet bend radius requirements or too difficult to install. Designing fiber-optic cables for aerospace applications is further complicated by constraints on the choice of materials available that satisfy safety requirements, such as low production of smoke and toxic chemicals when subjected to fire. Aerospace applications, as noted, are also particularly sensitive to size and weight concerns.

It is therefore desirable to improve generally upon fiber-optic cable technology to address the issues noted above and to provide greater resistance to damage from environmental and installation stresses. It is also desirable to reduce the impact of crushing, pinching, kinking or otherwise compromising the mechanical structure of a fiber-optic cable on the ability of the optical fibers to transmit light. It is further desirable to provide a fiber-optic cable in a form factor that facilitates installation while remaining compatible with standard multi-strand fiber-optic ribbon cable connectors.

BRIEF DESCRIPTION OF THE DRAWINGS

The accompanying drawings, which are incorporated in and constitute a part of this specification, illustrate embodiments of the invention and, together with a general description of the invention given below, serve to explain the principles of the invention.

FIG. 4 is a table presenting flammability test results of one embodiment of the invention with regard to smoke production and mechanical integrity.

FIG. 5 is a table presenting toxic gas test results of one embodiment of the invention when subjected to flame.

FIG. 17 is a table presenting results of the bending and pinching test shown in FIG. 16 performed on the invention and on a cable known in the art.

FIG. 18 is a table presenting results from a caustic fluid immersion test performed on the invention and on a cable known in the art.

FIG. 19 is diagram illustrating a MT connector.

FIG. 20 is diagram illustrating compatibility of the invention with the connector shown in FIG. 19.

FIG. 21 is a table presenting the weight of the invention and two cables known in the art.

SUMMARY OF THE INVENTION

Figure 1:
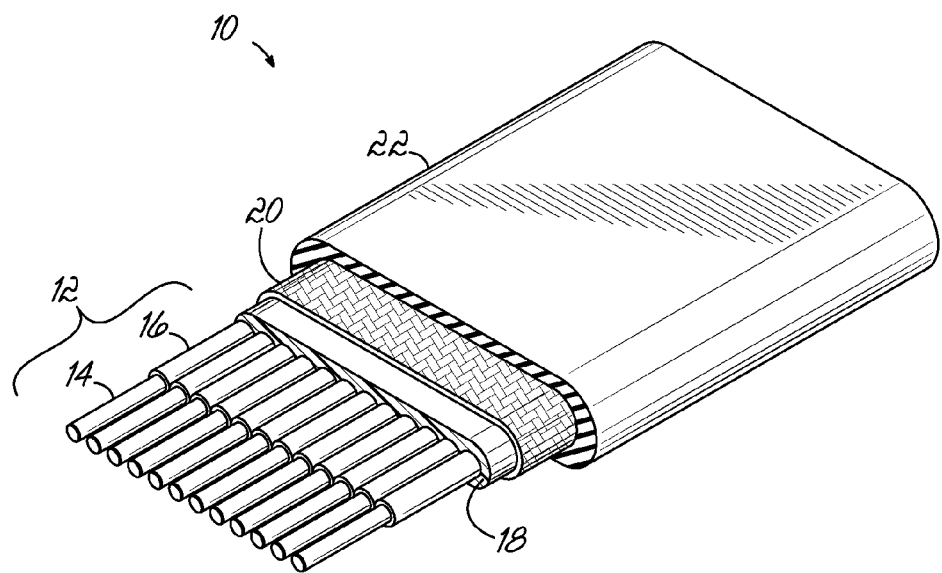
FIG. 1 is a perspective cross-sectional view of a fiber-optic cable known in the art.

Invention advantageously provides a multi-strand optical cable in a round form factor that is highly tolerant of crushing, pinching and bending. Through a unique combination of materials and dimensions, the invention is able to operate over a broad operating temperature range, has low smoke and toxic gas production when exposed to flame, is highly crush and bend resistant, has a non-preferential bend axis, is resistant to chemicals, and is compatible with high density optic connectors and capable of high density optical packaging.

In one embodiment of the invention, the optic-fiber cable has a round buffer tube comprised of a fluoropolymer encapsulated by a round strength member layer comprised of aramid and glass fibers, and external jacket comprised of a fluoropolymer. The specific combination of layer thicknesses of the buffer tube, strength member, and cable jacket, as well as the ability of the fibers to float within the buffer, enable an embodiment of the invention to have unexpectedly increased resistance to damage of the optical fiber and cable by mechanical forces. The buffer tube is a loose buffer design that allows one or more fibers to float inside the fiber-optic cable so that the fibers are free to move relative to each other and the buffer, reducing susceptibility to performance degradation from pinching or kinking when the cable is subjected to tight bends or crushing forces, and allowing compatibility with ribbon connectors. The round configuration advantageously reduces cable size, improving ease of installation into tighter spaces and allowing the fiber-optic cable to pass thought smaller apertures than a ribbon cable containing a similar number of fiber-optic strands. The round design may also provide improved crush resistance and does not have a preferential bend axis as compared to a ribbon cable.

Advantageously, because the fibers are loose, they may be ribbonized at the terminal end so as to be compatible with industry standard ribbon connectors, thus providing a ribbon connector in conjunction with a round cable form factor.

DETAILED DESCRIPTION OF EMBODIMENTS OF THE INVENTION

The fiber-optic cable constructed in accordance with the aspects of the present invention provides a multiple fiber cable that has decreased susceptibility to crushing, pinching and other mechanical damage. Furthermore, the fiber-optic cable is configured in such a way that it tolerates high operating temperatures, produces low smoke and toxicity in the presence of fire, has a non-preferential bend axis, and is capable of use in high density optical packaging and fiber-optic connectors. Such design parameters are particularly important in aerospace applications where size and weight are critical factors and environmental conditions are harsh. In addition to meeting the design goals noted above, the present invention also provides improved bend/kink performance, so that the cable may be more vigorously implemented in tighter spaces. All of these various benefits are achieved as noted, without a degradation of the optical, mechanical or thermal performance the fiber-optic cable while maintaining compatibility with MT ribbon fiber-optic cable connectors. MT connectors are designed for ribbon fiber applications and are capable of accommodating up to 72 fibers in a single rectangular terminal. By accommodating multiple optical fibers in a single terminal, MT connectors can provide higher connection densities than single strand fiber-optic cable connectors, and are thus preferred over other connector types in aerospace applications where space is limited. Accordingly, the present invention presents significant improvements to the state of the art of fiber-optic cables.

For the purposes of illustrating benefits of the present invention and improvements over the prior art, it is helpful to understand the construction of a conventional prior art ribbon fiber-optic cable. Referring to FIG. 1, cable 10 is a ribbon fiber-optic cable known in the art for a multi-fiber cable design. Cable 10 incorporates twelve optical fibers 12 and a series of outer layers surrounding the optical fibers 12. Each optical fiber 12 includes a glass strand 14 circumferentially surrounded by a cladding layer 16 that allows for optical signals to be confined to the glass strand 14. The cladding 16 may also provide color coding so that individual optical fibers 12 can be identified when making connections to a terminal (not shown). The optical fibers 12 are arranged substantially in a planar configuration within the cable 10 in such a way so that the cable 10 is compatible with industry standard 12 strand MT ribbon connectors. A buffer layer 18 encloses the optical fibers 12 to provide buffering and support for the optical fibers 12, and is configured so that optical fibers 12 are held in place to maintain their relative position within the cable 10. A strength member 20 is formed of a woven fiber material, such as aramid, fiberglass or a blend of the two, and encloses the buffer layer 18 to provide tensile strength to the fiber optic cable 10. Finally, a jacket layer 22 encloses the strength member 20, providing an outer sheath to protect the cable 10 from abrasions and to facilitate pulling the cable 10 through apertures during installation. As will be understood by a person having ordinary skill in the art of fiber optic cables, due to the planar configuration of cable 10, it may demonstrate axially dependant bend preferences and require larger apertures than a round fiber. Therefore, such a design is not particularly suitable for use in aerospace applications where space is constrained.

Figure 2:
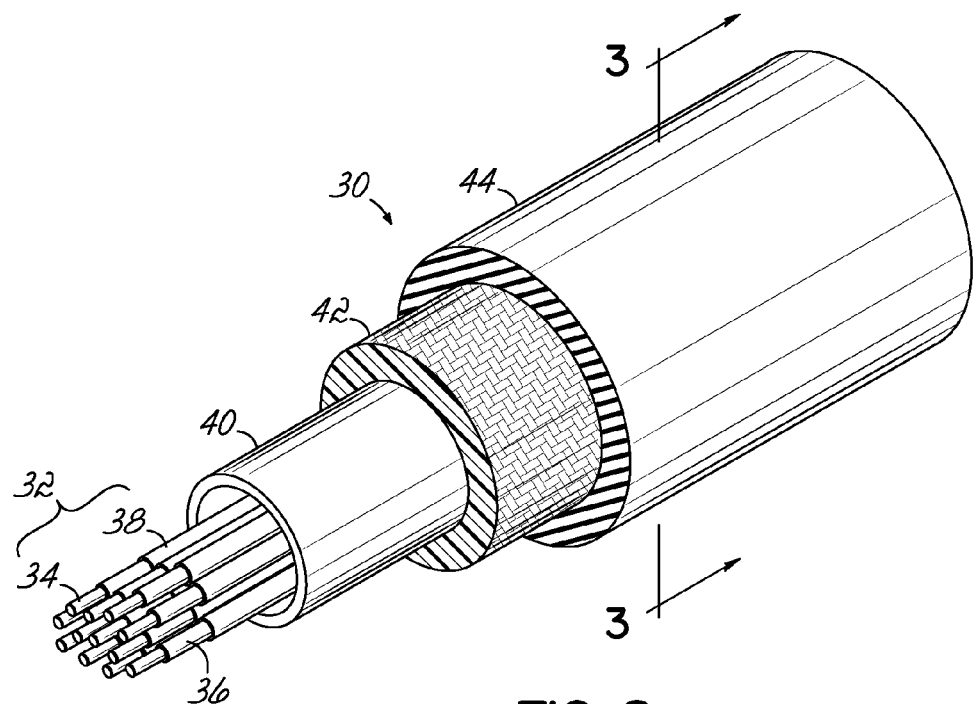
FIG. 2 is a perspective cross-sectional view of a fiber-optic cable in accordance with one embodiment of the invention.
Figure 3:
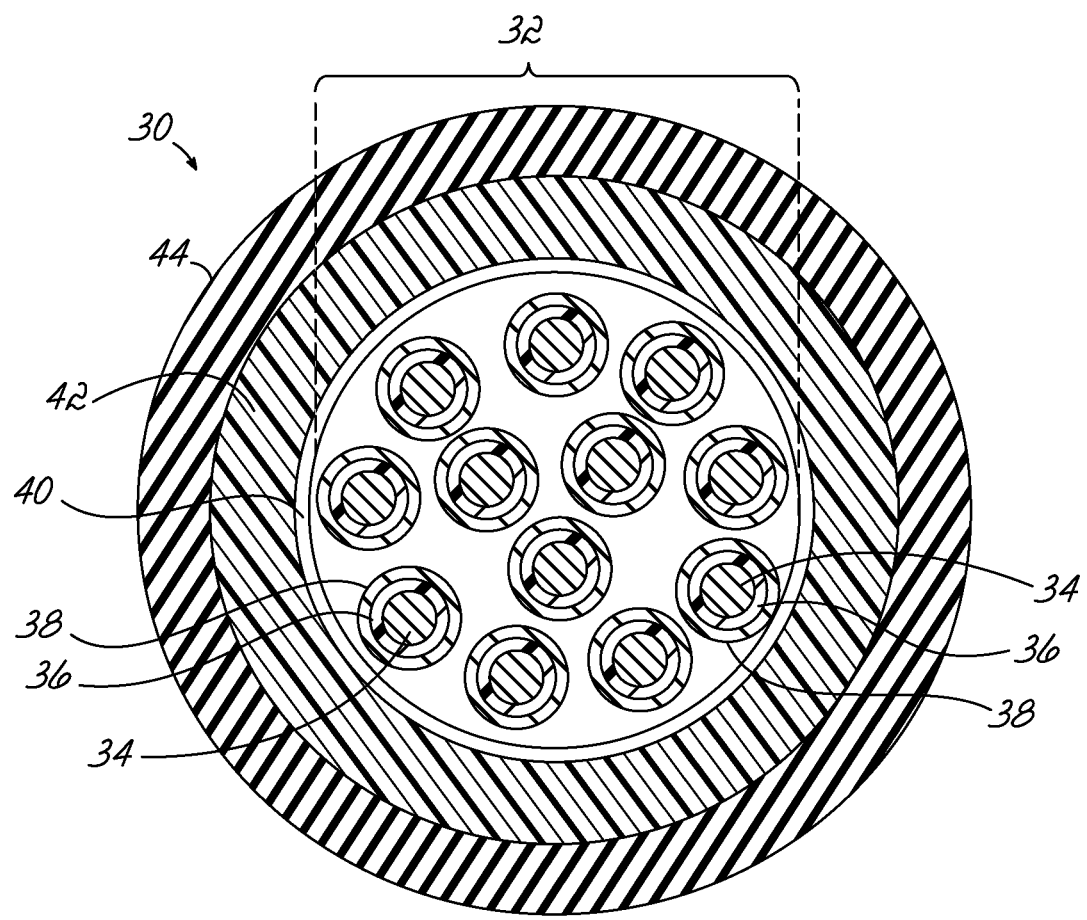
FIG. 3 is a cross-sectional view along lines 3-3 of FIG. 2.

Turning now to FIGS. 2 and 3, FIG. 2 presents a perspective cross sectional view of one embodiment of the invention, while FIG. 3 presents a cross-sectional end view of an embodiment of the invention where like numbers refer to like elements in FIG. 2. Specifically, cable 30 is a fiber-optic cable including a plurality of loose optical fibers 32. For example, in one embodiment, cable 30 may include 12 optical fibers, although other embodiments of the invention may incorporate more or fewer optical fibers depending on the intended application. The optical fiber elements 32 each include a core 34 of a light transmitting material, such as glass, plastic, polymer or plastic-clad material, and a suitable cladding 36, as is known in fiber-optic technology. The optical fibers 32 may be single mode or multi-mode, may be graded-index or step-index, and may have standard or non-standard dimensions, as will be understood by a person of ordinary skill in the art of fiber-optics. For example, multi-mode optical fibers with cores of 50.0 µm and 62.5 µm may be utilized. Alternatively, single mode fibers with mode field or core diameters that range from 1.0 µm to 9.5 µm may be suitable for implementing in an embodiment of the present invention. Of course, other diameter fibers, having core diameters of 100 µm, or over 200 µm might be used. The cladding will generally have a thickness in the range of 30 µm to 70 µm, for example, taking a 62.5 µm diameter fiber out to a 125 µm outer diameter (O.D.). Suitable core/cladding fibers might have O.D.'s of 125 µm, 172 µm, or 240 µm, for example. Various different cladded fibers are available commercially, as noted below.

Generally, an outer coating layer, or primary buffer layer 38, is positioned to surround each optical fiber 32. In some fibers, the coating is a high temperature material, such a high temperature acrylate. For example, a 100° C. acrylate available from Corning of Corning, N.Y., might be suitable. Other possible coatings include 125° C. Silicone coating from Corning, or a 150° C. acrylate coating material available from Fiberlogix of Warren, N.J.; Verillon of North Grafton, Mass.; J-Fiber of Juna, Germany; and Nufern of East Granby, Connecticut might be utilized. A 200° C. acrylate coating from Fiberlogix might also be utilized. In addition to acrylates and other materials as noted above, a polyimide coating, such as a 200° C. polyimide coating might be utilized, and is available from OFS of Norcross, Ga.; Polymicro Technologies of Phoenix, Ariz.; Nufern; and Verillon. Additionally, some >200° C. ceramic coatings or hybrid glass might also be suitable for implementing the coating layer 38 of the present invention. The coating might have a thickness of around 120 μm, for example. Various coated fibers are commercially available, as noted below, and the invention is not limited to a particular fiber or coated fiber. Some suitable fibers for the invention include:

| Primary Buffer | | |
| --- | --- | --- |
| Fiber Types | Coatings Used | Vendors |
| Multimode | Acrylate-CPC7 | Corning, Hickory, NC |
| SingleMode | Acrylate-CPC7 | Corning, Hickory, NC |
| Multimode | Polyimide | OFS, Norcross, GA; Verillon, North Grafton, MA; Nufern, East Granby, CT; Fiberlogix, Warren, NJ |
| SingleMode | Polyimide | OFS, Norcross, GA; Verillon, North Grafton, MA; Nufern, East Granby, CT; Fiberlogix, Warren, NJ |
| Multimode | High Temperature Acrylate-HTA | Fiberlogix, Warren, NJ; Verillon, North Grafton, MA; J-Fiber, Juna, Germany; Nufern, East Granby, CT |
| SingleMode | High Temperature Acrylate-HTA | Fiberlogix, Warren, NJ; Verillon, North Grafton, MA; J-Fiber, Juna, Germany; Nufern, East Granby, CT |
| Step Index | Polyimide | Nufern, East Granby, CT; Verillon, North Grafton, MA; Polymicro Technology, Phoenix, AZ |

In accordance with one aspect of the invention, the multiple fibers 32 are not individually further buffered or insulated within the overall cable design. Furthermore, the fibers 32 are not locked or maintained in a tight ribbon or other configuration. Fibers 32 are loosely arranged, as a bundle of individual fibers, to provide significant benefits over prior art cables. More specifically, the optical fiber strands may be encased by a buffer tube 40 comprised of a fluoropolymer compound, such as Fluorinated Ethylene Propylene (FEP), Polytetrafluoroethylene (PTFE), Perfluoroalkoxy (PFA), Polyether Ether Ketone (PEEK), Polyvinylidene Fluoride (PVDF), or Ethylene Tetrafluoroethylene (ETFE), or any other suitable fluoropolymer. Prior art fiber-optic cables use a buffering system that may be considered a tight buffer. With a tight buffer, a thermoplastic layer is coated, or extruded, onto the optical fiber or fibers, and the optical fiber is held tight within the buffer layer, substantially as shown in FIG. 1. Embodiments of the invention employ multiple fibers 32 that are placed loosely a loose buffer tube 40. The optical fibers 32 are allowed to float within the buffer tube 40.

In one embodiment of the invention, a filament (not shown) may be directed into the buffer tube 40 as the buffer tube 40 is extruded by drawing the filament forward through the center of the tube die as the buffer tube 40 is formed around the filament. The filament may then be used to direct or otherwise place the optical fibers 32 into the buffer tube 40 in a later fabrication step. In another embodiment of the invention, the filament is placed in the buffer tube 40 in a later fabrication step using a feed wire. The buffer tube 40 is dimensioned so that the optical fibers 32 are freely floating in the tube—i.e. they may shift position relative to each other and the buffer tube 40 as the cable is manipulated. In yet another embodiment of the invention, the optical fibers 32 may be directed into the buffer tube 40 as the buffer tube 40 is extruded by drawing the optical fibers 32 forward through the center of the tube die as the buffer tube 40 is formed around the fibers 32.

In one embodiment of the invention, the buffer tube 40 has an outside diameter in the range of about 0.081 inches to 0.123 inches. More preferably, the buffer tube 40 has an outside diameter that is in the range of about 0.089 inches to 0.115 inches. Still more preferably, the buffer tube 40 has an outside diameter of about 0.102 inches.

To achieve the various benefits of the invention, the buffer tube 40 has a particular wall thickness in relation to its overall construction. In one embodiment, the buffer tube 40 has a wall thickness in the range of about 0.012 inches to 0.028 inches, more preferably in the range of about 0.016 inches to 0.024 inches, and still more preferably about 0.200 inches.

For accommodating the plurality of fibers, the buffer tube 40 has an inside diameter in the range of about 0.057 to 0.067 inches, more preferably about 0.060 inches.

In one specific embodiment of the invention, the buffer tube is formed of PTFE and has a wall thickness of about 0.020 inches, an inside diameter of about 0.062 inches, and outside diameter of about 0.102 inches. In another embodiment of the invention, the buffer tube may be a commercially available tube, such as a 15 AWG size PTFE tube manufactured by Zeus Inc., of Orangeburg, S.C.

Referring again to FIGS. 2 and 3, fiber-optic cable 30 incorporates outer layers that operate in conjunction with the buffer tube for further protection of the optical fibers. Specifically, the fiber-optic cable 30 includes a strength layer, or strength member 42, that surrounds the buffer tube 40 and optical fibers 32, and an outer jacket 44 that surrounds the strength member 42.

The strength member 42 is formed of woven fibers that may include both aramid fibers and glass fibers. For example, aramid fibers include Kevlar, available from DuPont, and Twaron from Akzo of Zuchwil, Germany. Suitable glass fibers, or fiberglass material, are available from Conneault Industries of West Greenwich, R.I., and American & EFIRD, Inc. of Mt. Holly, N.C. In one particular embodiment of the invention, 5 aramid fibers and 11 glass fibers are woven in a 16-fiber woven braid, according to known techniques. A suitable weave angle might be 25 picks total per inch, with 19 glass picks and 6 aramid picks. In another embodiment of the invention, the aramid fibers are 500 denier Kevlar, available from Dupont, and the glass fibers are industry standard glass 225½ natural 2 fibers, available from Conneault Industries. Braiding equipment, such as braiders from Wardwell of Central Falls, R.I.; Hacoba of Wuppertal, Germany, or Steeger of Inman, S.C.; Niehoff Endex North America Inc. of Swedesboro, N.J. might be utilized. In one embodiment of the invention, the strength member 42 has a weave thickness in the range of about 0.006 inches to 0.012 inches. More preferably, the weave thickness is about 0.008 inches. In an embodiment of the invention, the outside diameter of the strength member in the construction of the cable is in the range of about 0.093 inches to 0.147 inches. More preferably, the outer diameter is in the range of 0.104 to 0.130 inches, and still more preferably, about 0.118 inches.

Outer jacket 44 is formed of a fluoropolymer material that has low smoke, flame and toxicity characteristics suitable for the temperature requirements of the cable, as noted above, with respect to the smoke and toxicity requirements of the second buffer layer. A fluoropolymer material, such as PFA, might be utilized to form jacket 44. Conventional thermoplastic extrusion processes might be utilized to apply the outer jacket. Furthermore, coating processes might also be utilized for forming the outer jacket 44. In one particular embodiment of the invention, the outer jacket 44 may be formed of a single layer of extruded PEA material, such as PFA available under the trademark Neoflon™ from Daikin America, Inc. of Orangeburg, N.Y. or the registered trademark Teflon® PFA from DuPont. The heat processing temperatures for extrusion are available from both Daikin and DuPont for the specific material. In another embodiment of the invention, the outer jacket 44 may be formed of a single layer of PTFE, also available under the trademark Teflon® PTFE from DuPont. Other potential jacket fluoropolymer materials include FEP, PFA, PEEK, PVDF, and ETFE. In one embodiment of the invention, the outer jacket has an outside diameter in the range of about 0.112 inches to 0.160 inches. More preferably, the outside diameter is in the range of about 0.144 inches to 0.155 inches, and still more preferably has an outside diameter of about 0.150 inches.

Once the fiber-optic cable 30 has been jacketed, optical fibers 32 may be introduced into the buffer tube 40 in a fiber cable stranding process. The optical fibers 32 are loosely arranged in a bundle in the buffer tube 40. Thus, in accordance with one aspect of the invention, the multiple fibers 32 are not introduced into the cable 30 until the loose buffer 40, strength layer 42 and outer jacket 44 have been fully formed. This is possible because of the looseness of the buffer tube 40. Advantageously, this aspect of the invention allows for numbers and types of optical fibers 32 to be selected after a large portion of the cable manufacturing process has been completed, simplifying stocking and reducing manufacturing time on custom orders. Furthermore, the fibers 32 may be replaced if one or more fibers 32 are later found defective, or to upgrade to a different type of fiber 32, without disposing of the entire cable, providing significant benefits over prior art cables. Still further, for embodiments of the invention where optic fibers 32 are directed into the loose buffer tube 40 during the extrusion process, the loose construction allows the optical fibers 32 to be replaced with the same or different fibers at a later time after the fiber-optic cable 30 is formed.

For embodiments of the invention where a filament is directed into the buffer tube 40 during extrusion, the fiber-optic cable may be laid out in a substantially straight orientation on lay plates. In an embodiment of the invention, optic fibers 32 from twelve individual pay-off reels are each attached to the filament extending from the proximal end of the fiber cable 30, although other numbers of optic fibers 32 may be provided depending on the intended application of the fiber-optic cable 30. The filament extending from the distal end of the fiber-optic cable 30 is then attached to a take up reel. The fiber-optic cable 30 is then held substantially in place as the pay off and take up reels are rotated so that the optical fibers 32 are drawn into the fiber-optic cable. For embodiments of the invention that do not direct a filament into the loose buffer tube 40 during formation of the tube, a lead wire may be inserted into buffer tube 40 at the proximal end of the fiber-optic cable 30. In one embodiment of the invention, the lead wire may be a PTFE coated stainless steel wire with a diameter of about 0.039 inches. The filament is then attached to the stainless steel lead wire and directed into the buffer tube 40 of the fiber-optic cable 30 by pulling the lead wire from the distal end of the fiber-optic cable 30. Once the filament has been placed into the buffer tube 40 of the fiber-optic cable 30, the optical fibers 32 may be directed into the buffer tube 40 as previously described herein.

The unique combination of materials used, as well as the construction of the inventive fiber-optic cable result in superior smoke and toxicity performance. The specific combination of layer thicknesses of the buffer tube 40, strength member 42, and cable jacket 44 of the inventive fiber-optic cable also produces superior mechanical characteristics and resistance to environmental damage, thus giving it a more durable and robust construction, particularly in applications with limited space, such as aerospace applications. Such advantages, and other advantages provided by the present invention are discussed further herein below. All test samples of the inventive cable used in the following tests are about 36 inches long, with a loose buffer layer 40 formed of PTFE having an inside diameter of about 0.062 inches and a wall thickness of about 0.020 inches, a strength member 42 having 5 aramid fibers and 11 glass fibers woven in a 16-fiber woven braid having a weave thickness of about 0.008 inches, and an outer jacket formed of PTFE with an outside diameter of about 0.150 inches.

Referring now to FIGS. 4 and 5, tables of smoke and toxicity test results are presented showing the low smoke and toxic gas emissions of the inventive cable when subjected to flame testing. For example, a smoke specific optical density value of less than 100 in four minutes is preferred when tested in accordance with Boeing Commercial Airline Company's D6-51377 Rev. F specification support standard BSS-7238 smoke density test. Even more preferable is a value of less than 50 in four minutes. As can be seen in FIG. 4, the optical smoke densities recorded after four minutes for several samples of embodiments of the invention average only 7.9, far better than the maximum density allowed.

The test cables were also exposed to temperatures extremes ranging from −65° C. to +260° C. to test their heat resistance. The inventive cable showed little or no visible damage as a result of these temperatures. In contrast, the protective layers of a 12 fiber, 50 µm, riser jacket, flat ribbon cable FOA 8100/1 12/1 manufactured by W. L. Gore & Associates, Inc. of Newark, Del. were severely compromised.

The invention also has low emission of the gases Hydrogen Cyanide (HON), Carbon Monoxide (CO), Nitrous Oxides ($NO_x$), Sulfur Dioxide ($SO_2$), Hydrogen Flouride (HF), and Hydrogen Cloride (HCl) when subjected to fire tests. As shown in FIG. 5, when tested in accordance with the European Standard EN3745-602 for testing cables used in aircraft, all toxic emissions measured are below the maximum allowed amounts, ranging from 1% for HCl to 10% for $NO_x$ and HF.

The ability of the optical fibers 32 to move within the loose buffer 40, as well as the specific combination of layer thicknesses of the buffer tube 40, strength member 42, and cable jacket 44, enable the inventive cable to have unexpectedly increased resistance to damage of the optical fiber by mechanical forces such as crushing, pinching and bending of the fiber-optic cable. As may be appreciated, because fiber-optic cables transmit light down a glass fiber, bending and pinching is a significant issue in the use of such cable. Specifically, a fiber-optic cable that is physically manipulated and bent or kinked must still be able to transmit the signal at a suitable optical power, even when a specified bend/kink radius has been exceeded. The present invention provides a significant improvement over the art in mechanical ruggedness with respect to kinks, bends, and crushing forces as is demonstrated by the following series of experimental results.

Figures 6, 7:
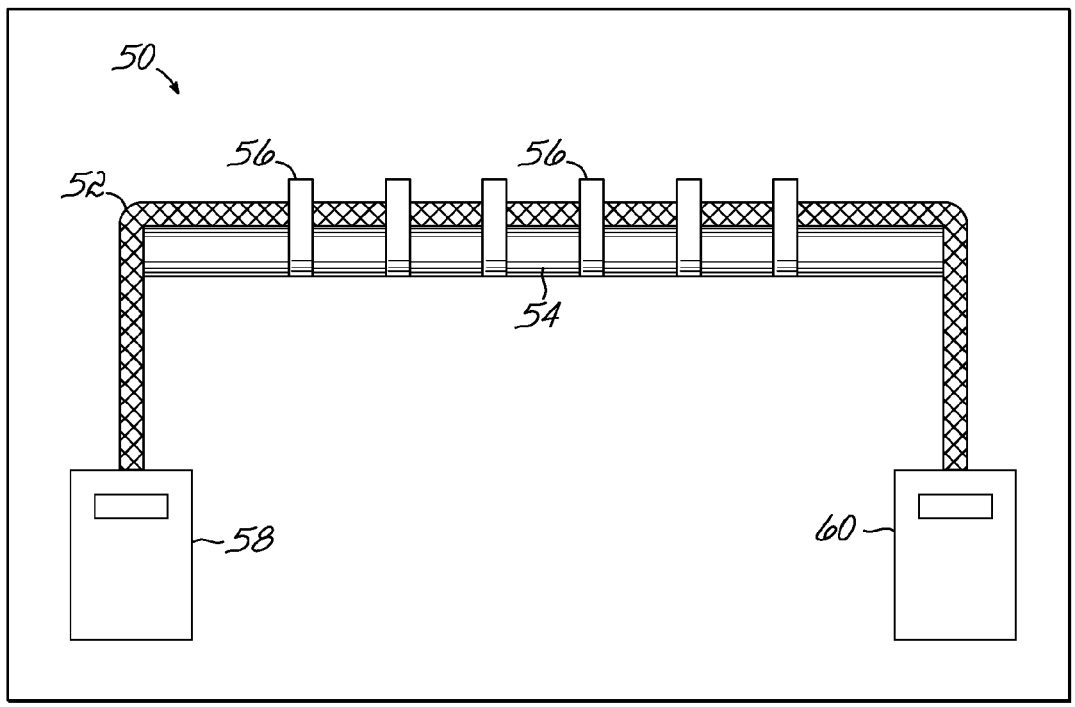
FIG. 6 is diagram illustrating a clamping test setup.
FIG. 7 is a table presenting results of the clamping test shown in FIG. 6 performed on the invention and on a cable known in the art.

Referring now to FIGS. 6 and 7, a testing configuration 50 and associated results table is presented. FIG. 5 illustrates a test configuration that simulates a typical cable installation on an aircraft. The fiber-optic cable under test 52 is strapped to a mandrel 54 with straps 56 (e.g.: nylon straps or cable ties) as shown. A Laser Light Source (LLS) 58 is operatively connected to a proximal end of the cable under test 52, and a Laser Detection System (LDS) 60 is operatively connected to the distal end of the cable under test 52. Laser light amplitude is measured by the LDS 60 before and after the straps 56 are installed. Test results showing attenuation changes for both the inventive cable and a 12 fiber, 9 µm, plenum jacket, round distribution cable S09MD12CNPY available from The Light Connection, of Oriskany, N.Y., are presented in FIG. 7. The cable having the design of the inventive cable is indicated as INVENTION and had no increases in attenuation as a result of being strapped to the mandrel 54. The S09MD12CNPY cable, on the other hand, experienced an increase in attenuation of 0.39 dB, indicating that the resistance of the inventive cable to pinching forces associated with tie wraps is superior to the existing cable constructions.

Figures 8, 9:
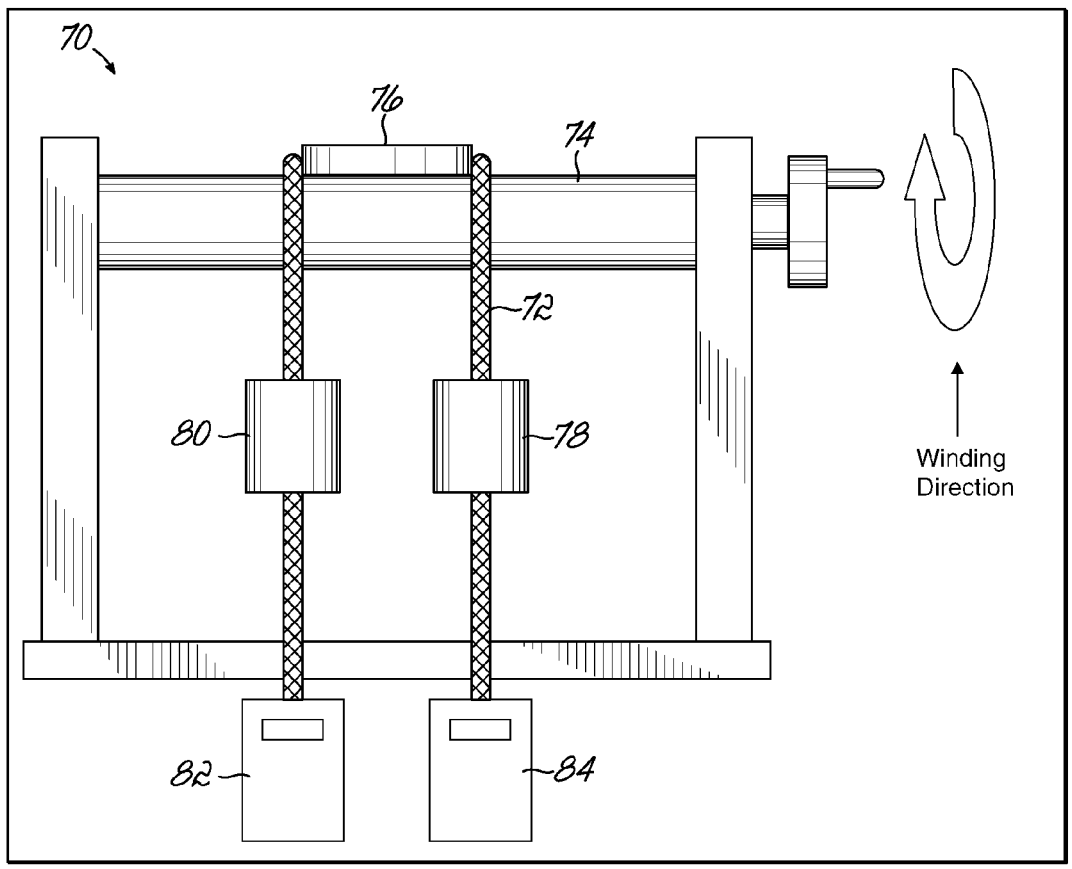
FIG. 8 is diagram illustrating a bending test setup.
FIG. 9 is a table presenting results of the bending test shown in FIG. 8 performed on the invention and on a cable known in the art.

Referring now to FIGS. 8 and 9, a testing configuration 70 and associated results table is presented. FIG. 8 illustrates a test configuration that simulates the environmental effects of extreme temperatures, bending and tension on the optical and mechanical performance of the fiber-optic cable under test 72. The cable under test 72 is mechanically coupled to a mandrel 74 by an anchor 76 and placed under tension by weights 78, 80. In a similar fashion as previously discussed, a LLS 82 is coupled to the proximal end of the cable under test 72 and a LDS 84 is coupled to the distal end. Light amplitude at the distal end is measured before and after the cable under test 72 is bent under tension at −65° C. The test is then repeated on the same sample cable for a temperature of +180° C. The cable having the design of the inventive cable is indicated as INVENTION and had no increases in attenuation as a result of being subjected to the environmental bending and temperature extremes. A 12 fiber, 50 µm, riser jacket, flat ribbon cable M50RB12C6NR0, available from the Light Connection of Oriskany, N.Y., on the other hand, experienced an increase in attenuation of 2.41 dB in the cold test, and failed entirely in the hot test.

Figures 10, 11:
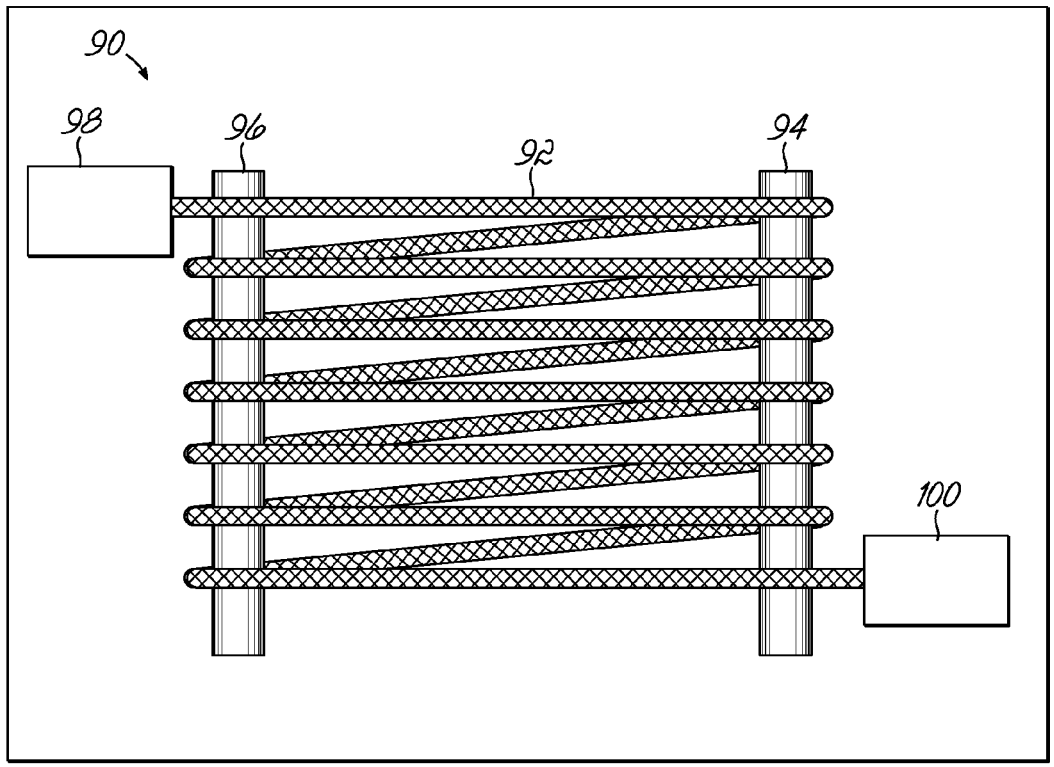
FIG. 10 is diagram illustrating a bending test setup.
FIG. 11 is a table presenting results of the bending test shown in FIG. 10 performed on the invention and on a cable known in the art.

Referring now to FIGS. 10 and 11, a testing configuration 90 and associated results table is presented. FIG. 10 illustrates a test configuration that simulates the effects of multiple 180 degree bends in a typical fiber-optic cable installation by wrapping the cable under test 92 around a pair of mandrels 94, 96 as shown. In a similar fashion as previously discussed, a LLS 98 is coupled to the proximal end of the cable under test 92 and a LDS 100 is coupled to the distal end. Light amplitude at the distal end is measured before and after the cable under test 92 is wrapped around the mandrels 94, 96. The cable having the design of the inventive cable is indicated as INVENTION and experienced a maximum increase in attenuation of 0.04 dB as a result of being wrapped around the mandrels 94, 96. The M50RB12C6NR0 flat ribbon cable, on the other hand, experienced an increase in attenuation of 0.69 dB.

Figures 12, 13:
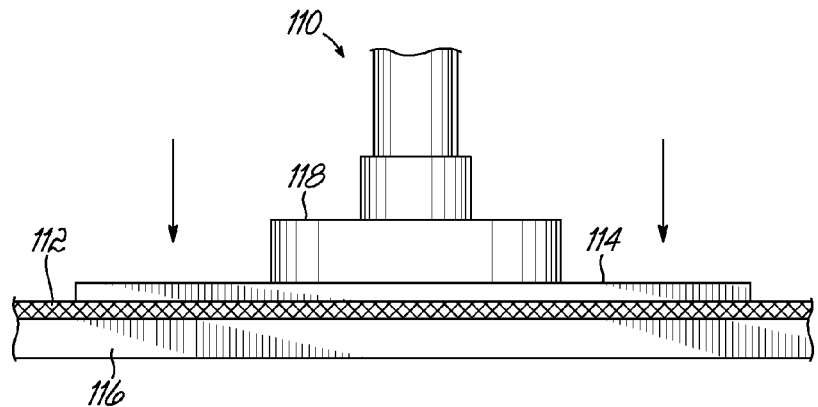
FIG. 12 is diagram illustrating a crushing force test setup.
FIG. 13 is a table presenting results of the crushing force test shown in FIG. 12 performed on the invention and on a cable known in the art.

Referring now to FIGS. 12 and 13, a testing configuration 110 and associated results table is presented. FIG. 12 illustrates a test configuration that simulates the effects of crushing forces by placing the cable under test 112 between a top plate 114 and a bottom plate 116 and applying downward force to the top plate 114 with a press 118 mechanically secured to the bottom plate 116. The purpose of this test is to simulate forces that may be encountered during installation, operation and maintenance events. Attenuation of light through the cable under test 112 is measured before and during the application of the crushing force. The cable having the design of the inventive cable is indicated as INVENTION and experienced no increase in attenuation during application of 100 lbs of compression, while the S09MD12CNPY round distribution cable experienced a maximum increase in attenuation of 0.45 dB.

Figures 14, 15:
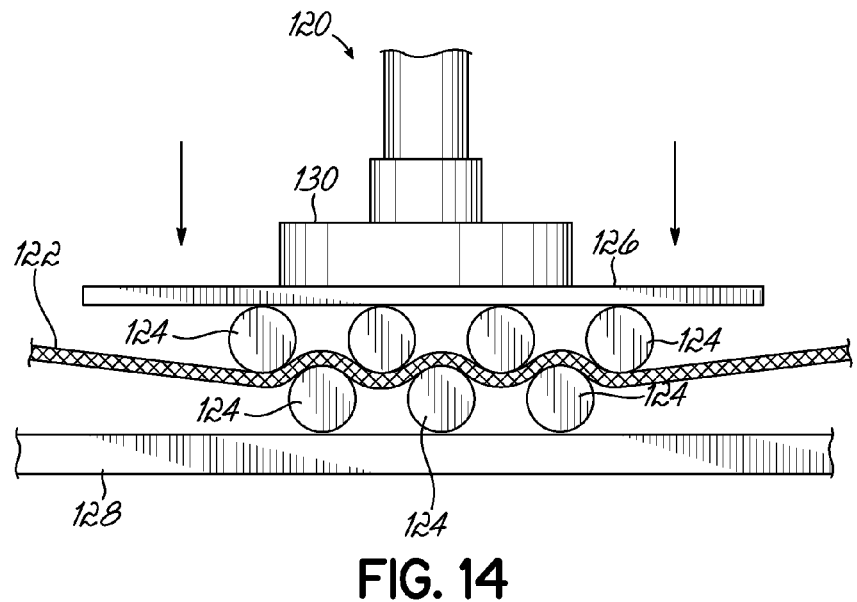
FIG. 14 is diagram illustrating a pinching test setup.
FIG. 15 is a table presenting results of the pinching test shown in FIG. 15 performed on the invention and on a cable known in the art.

Referring now to FIGS. 14 and 15, a testing configuration 120 and associated results table is presented. FIG. 14 illustrates a test configuration that simulates the effects of pinching forces by placing the cable under test 122 between a series of mandrels 124, placing this assembly between a top plate 126 and a bottom plate 128, and applying downward force to the top plate 126 with a press 130 mechanically secured to the bottom plate 128. The purpose of this test is to simulate the crushing and bending forces that may be encountered during installation, operation and maintenance events. Attenuation of light through the cable under test 122 is measured before and during the application of crushing force. The cable having the design of the inventive cable is indicated as INVENTION and experienced no increase in attenuation during application of 30 lbs of compression, while the S09MD12CNPY round distribution cable experienced an increase in attenuation of 1.14 dB.

Figure 16:
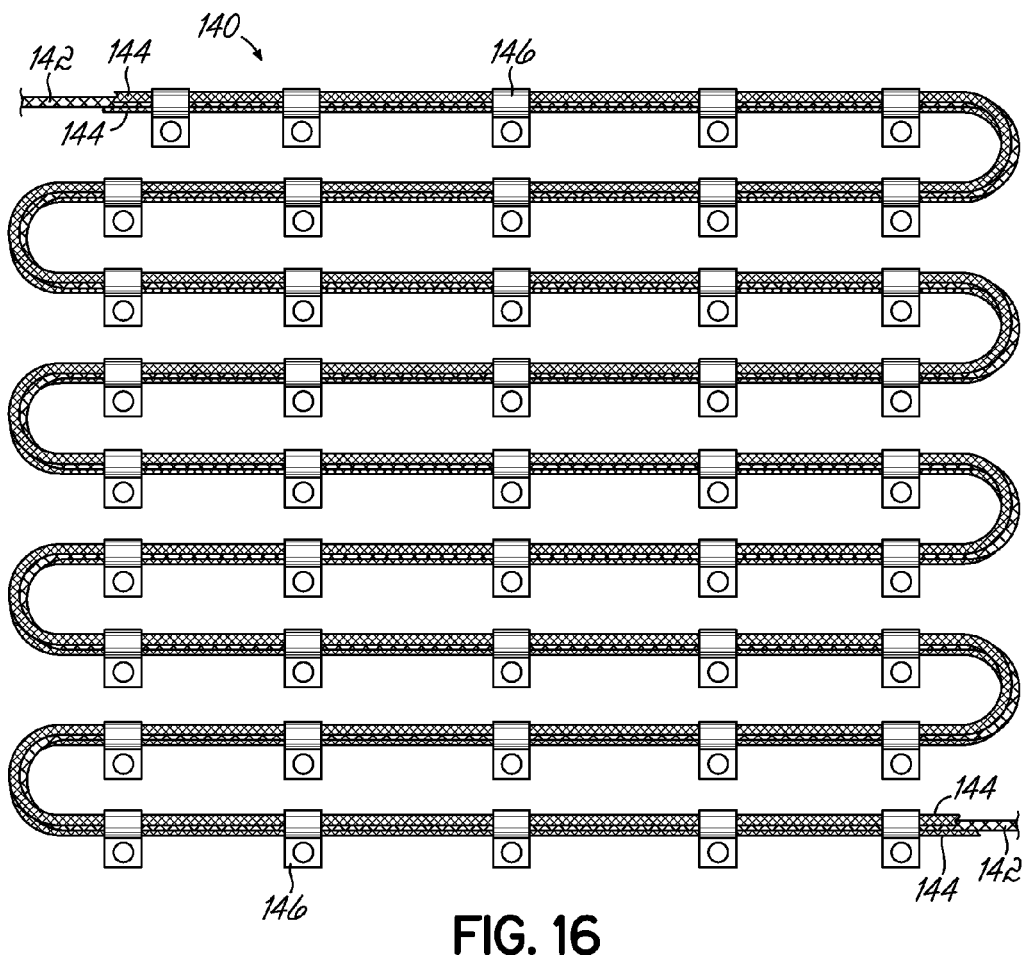
FIG. 16 is diagram illustrating a bending and pinching test setup simulating a cable harness deployment.

Referring now to FIGS. 16 and 17, a testing configuration 120 and associated results table are presented. FIG. 16 illustrates a test configuration 140 that simulates the bending and pinching environmental effects experienced by a fiber-optic cable in a cabling harness installation including multiple cables secured with cable tie-wraps. The cable under test 142 was bundled with additional cable sections 144 of like cable and secured with tie-wraps 146 in a meandering planar configuration. Attenuation of light through the cables under test 142 was measured before and after being placed into the test configuration 140. The cable having the design of the inventive cable is indicated as INVENTION and experienced a 0.02 dB increase in attenuation, while the M50RB12C6NR0 flat ribbon cable experienced an increase in attenuation of 1.24 dB.

FIG. 18 is a table presenting the results of a fluid immersion test on the inventive cable and a sample of M50RB12C6NR0 fiber-optic cable available from The Light Connection of Oriskany, N.Y.. Fiber-optic cables in aerospace applications may be exposed to corrosive fluids such as de-icing fluids, hydraulic fluids and other chemicals associated with aircraft operation. To test the inventive cable's resistance to corrosive fluids, samples of the inventive cable and of the known cable were subjected to a fluid immersion test. The cables were immersed in aviation de-icing fluid for a period of time and their attenuation measured during and after immersion. The inventive cable is indicated as INVENTION and experienced no increase in attenuation or any noticeable mechanical deterioration, while the known cable experienced an increase in attenuation of 0.98 dB and was visibly damaged by the fluid.

In addition to the extreme ruggedness of the inventive cable, it also possesses superior physical properties advantageous to the aerospace industry that include compatibility with MC type connectors, small size and light weight. Referring now to FIGS. 19 and 20, FIG. 19 presents a perspective view of an industry standard MC connector termination shown on a round fiber-optic cable of the invention. MT connectors are often the preferred connector in aerospace applications because they provide a high-density optical interconnection in a small form factor. To facilitate ease of termination to a MT connector, optical fibers must be capable of fanning out to accommodate a ribbonized form factor as required by an MT connector. FIG. 20 is a perspective view illustrating how the loose bundling of the optical fibers in the inventive cable accommodates the planarization requirements of an MT type connector.

Referring now to FIG. 21, a table is presented showing the weight advantages of using a twelve strand embodiment of the inventive cable in place of multiple simplex cables. The inventive cable containing twelve optical fibers 32 in the buffer tube 40 has a mass of about 19 kg/km, while an equivalent bundle of twelve simplex cables of type NFO(EP)-125-1, manufactured by the Tensolite Company, of St. Augustine, Fla. has a mass of 55.2 kg/km. An equivalent bundle of twelve simplex cables of type C2225, manufactured by the OFS Corporation, of Norcross, Ga. has a mass of 42 kg/km. It is understood by persons having ordinary skill in the art of aerospace applications that light weight and small size is a highly desirable feature of any component installed in an airframe, thus the inventive cable offers significant advantages in aerospace applications due to its superior weight and size over known fiber-optic cables.

The improvements in bending, crush and pinch resistance, as well as the resistance to hostile chemical and thermal environments realized in the invention were unexpected in regard to prior art cables. As such, the improvements to fiber-optic cables, in accordance with aspects of the invention, extends beyond size, weight and form factor.

The present invention also provides additional improvements. The inventive cable has a lower weight (19 kg/km versus 42 kg/km) than existing NFO(EP)-125-1 and C2225 cables. As may be appreciated, in aerospace applications, space and weight are at a premium, within the design parameters of a system, and thus, improvements in size and weight realized by the present invention make the cable particularly useful for such aerospace applications. Furthermore, the lower diameter and non-preferential bend axis as compared to ribbon cables such as FOA 8100/1 12/1 becomes very important in order for the cable to be utilized with a variety of military and commercial connectors.

While the invention has been illustrated by a description of various embodiments, and while these embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative methods, and illustrative examples shown and described. Accordingly, departures may be made from such details without departing from the spirit or scope of applicant's general inventive concept.

What is claimed is:

1. A method of fabricating a fiber-optic cable comprising:
    providing a loose buffer layer in the form of a tube of a first fluoropolymer material having a wall thickness in the range of about 0.012 inches to 0.028 inches;
    wrapping the buffer layer in a strength member that includes aramid and glass fibers forming a buffer and strength member assembly;
    applying an outer jacket to the buffer layer and strength member assembly by coating the buffer layer and strength member assembly with a second fluoropolymer material in such a way to produce a fiber-optic cable with an outside diameter in the range of about 0.112 to 0.160 inches, the fiber-optic cable having a first end and a second end; and
    introducing a plurality of loosely arranged optical fibers into the buffer layer of the fiber-optic cable including inserting a lead wire into the buffer layer that is accessible at the first and second ends of the fiber-optic cable, attaching a filament to the lead wire and pulling the lead wire through the fiber-optic cable so the filament is accessible at both the first and second ends of the fiber-optic cable, and attaching the filament to the plurality of optical fibers and pulling the filament through the fiber-optic cable so the plurality of optical fibers is accessible at both the first and second ends of the fiber-optic cable.

2. The method of claim 1, wherein one or more pay-off reels are used to feed the filament and the plurality of loosely arranged optical fibers into the fiber-optic cable, and a take-up reel is used to pull the lead wire and filament through the fiber-optic cable.

3. The method of claim 1, wherein the lead wire is about 0.039 inches in diameter and comprised of a stainless steel coated with PTFE.

4. The method of claim 1, wherein twelve optical fibers are attached to the filament.

5. The method of claim 1, further comprising terminating the optical fibers and fiber-optic cable with a multiple fiber connector.

6. The method of claim 1, wherein the buffer layer has an inside diameter in the range of about 0.057 inches to 0.067 inches, and an outside diameter in the range of about 0.081 inches to 0.123 inches.

7. The method of claim 1, wherein the strength member has an outside diameter in the range of about 0.093 inches to 0.147 inches.

8. The method of claim 1, wherein the outer jacket has an outside diameter in the range of about 0.1440 inches to 0.1550 inches.

9. The method of claim 1, wherein the first fluoropolymer material comprising the buffer layer is selected from the group consisting of Fluorinated Ethylene Propylene, Polytetrafluroethylene, Perfluoroalkoxy, Polyether Ether Ketone, Polyvinylidene Fluoride, and Ethylene Tetrafluoroethylene.

10. The method of claim 1, wherein the buffer layer is wrapped by the strength member using a weaving process.

11. The method of claim 1, wherein the second fluoropolymer material comprising the outer jacket is selected from the group consisting of Fluorinated Ethylene Propylene, Polytetrafluroethylene, Perfluoroalkoxy, Polyether Ether Ketone, Polyvinylidene Fluoride and Ethylene Tetrafluoroethylene.

* * * * *